US00RE41704E

(19) United States
(12) Reissued Patent
Shih et al.

(10) Patent Number: US RE41,704 E
(45) Date of Reissued Patent: Sep. 14, 2010

(54) TIMING SIGNAL GENERATION FOR CHARGE-COUPLED DEVICE

(76) Inventors: Chen-Hsiang Shih, 10F, No. 8, Lane 8b, Heping Rd., Hsinchu City 300 (TW); Chen-Ho Lee, 47 No. 83, Lane 5050, Minghn Road, Hsinchu City 300 (TW)

(21) Appl. No.: 11/247,004

(22) Filed: Oct. 7, 2005

Related U.S. Patent Documents

Reissue of:
(64) Patent No.: 6,631,507
Issued: Oct. 7, 2003
Appl. No.: 09/967,711
Filed: Sep. 27, 2001

(51) Int. Cl.
*G06F 17/50* (2006.01)

(52) U.S. Cl. ..... 716/6; 716/1; 716/4

(58) Field of Classification Search ..... 716/6, 716/4, 1

See application file for complete search history.

(56) References Cited

U.S. PATENT DOCUMENTS 3,786,192 A * 1/1974 Chow ..... 370/376
4,216,465 A * 8/1980 Huelsman et al. ..... 341/138
4,646,119 A * 2/1987 Kosonocky ..... 377/60
4,873,647 A * 10/1989 Banki et al. ..... 716/1
5,867,212 A * 2/1999 Toma et al. ..... 348/311

* cited by examiner

*Primary Examiner*—Sun J Lin
(74) *Attorney, Agent, or Firm*—Stolowitz Ford Cowger LLP

(57) ABSTRACT

A method of generating timing signals for a charge-coupled device. A plurality of input timing signals produced by an application specific integrated circuit according to a system clock is transmitted to the charge-coupled device. The programmable timing signals for the charge-coupled device are produced by determining the position of each cycle for these input timing signal, adjusting each cycle of the input timing signals in each system clock cycle and downloading their relationship into the application specific integrated circuit by programming.

21 Claims, 3 Drawing Sheets

TIMING SIGNAL GENERATION FOR CHARGE-COUPLED DEVICE

Matter enclosed in heavy brackets [ ] appears in the original patent but forms no part of this reissue specification; matter printed in italics indicates the additions made by reissue.

BACKGROUND OF THE INVENTION

1. Field of Invention

The present invention relates to a method of generating timing signals. More particularly, the present invention relates to a method of generating timing signal for controlling a charge-coupled device.

2. Description of Related Art

A number of factors may affect the scanning speed of a scanner or a digital camera. Factors including revolving speed of stepper motor (for a scanner), the number of sensor cells within a charge-coupled device, pixel resolution, the setting of clocking signals during operation are a few of the major ones. In general, these factors are adjusted according to the type of functions desired by a particular scanner or digital camera.

FIG. 1 is a block diagram showing a portion of the circuit inside a conventional scanner. As shown in FIG. 1, intensity of light captured by a charge-coupled device 102 is converted into an analogue signal and then transmitted to an analogue front-end processor 106 inside an application specific integrated circuit 104. The analogue front-end processor 106 is a device for converting analogue signal into digital signal and generating corresponding clocking signals. The analogue front-end processor 106 converts the analogue signal from the charge-coupled device 102 into a digital signal and transmits the digital signal to a digital signal processor 108 for further processing.

The charge-coupled device 102 needs several clocking signals for convening external light intensity to an analogue signal. The required clocking signals are provided by the analogue front-end processor 106. FIG. 2 is a series of timing diagrams showing the clocking signals submitted to a conventional charge-coupled device during operation. The analogue front-end processor 106 provides input timing shift register signals Φ1, Φ2 to the charge-coupled device 102. A cycle in these timing diagrams is actually composed of a plurality of system clock cycles. For example, as shown in FIG. 2, each cycle in the shift register clock cycles Φ1, Φ2 comprises 12 system clock (SystemClk) cycles.

In FIG. 1, light intensity sensed by the sensor cell (not shown) in the charge-coupled device 102 is stored as electric charges within a shift register (not shown) inside the charge-coupled device 102. According to the shift register clock cycles Φ1, Φ2, the shift register transfers the stored electric charges to a pixel processing circuit (not shown) also inside the charge-coupled device 102. When the shift register clock signal Φ1 drops from a 'H' to a 'L' logic level and the shift register clock signal Φ2 rises from a 'L' to a 'H' logic level as shown in FIG. 2 (the $7^{th}$ clock cycle), electric charges stored inside another shift register (not shown) are transmitted to the pixel processing circuit. In a similar manner, electric charges stored in any number of shift registers (not shown) are transferred to the pixel processing circuit (not shown) of the charge-coupled device 102.

Reset signal RS and positioning signal CLP are operating cycles for the charge-coupled device 102. In the third clock cycle, the reset signal RS is at a 'L' logic level (low potential) and the analogue front-end processor 106 generates a reset voltage to flush out the former electric signals within the charge-coupled device 102. In the fourth clock cycle, the reset signal RS changes from 'L' to 'H' (a high potential) and the positioning signal CLP changes from a 'H' to a 'L' logic level. The analogue front-end processor 106 samples a positioning voltage at time node CDS1. The positioning voltage serves as a reference voltage for the analogue front-end processor 106. In the sixth clock cycle, the positioning signal CLP changes back from 'L' to 'H' and the analogue front-end processor 106 samples a charge voltage at time node CDS2. The charge voltage is derived from the charge signal sent from the shift register (not shown) to the analogue front-end processor 106. Voltage difference between the positioning voltage sampled at time CDS1 and the charge voltage sampled at time CDS2 is the brightness value of a first pixel recorded by the charge-coupled device 102 (refer to FIG. 1). The brightness value is registered as an analogue signal.

The phase shift clock signal of a shift register inside a conventional charge-coupled device often has a fixed duty cycle. When a scanner is conducting a low resolution scanning, a faster image processing spread is achieved by using a higher frequency for the phase shift signal. Correspondingly, duty cycle of the analogue front-end processor (time node CDS1 and time node CDS2) is shortened. However, the charge signal from the shift register is submitted in a non-stabilized state. Hence, the signal sampled by the analogue front-end processor is inaccurate and frequency of the pixel processing cycle is increased leading to a high vulnerability to noise interference. Consequently, quality of the scanned image may deteriorate. To produce a high-resolution image, scanning speed of a scanner must slow down. In other words, one must make a compromise between scanning speed and scanning quality.

In addition, the charge-coupled device needs to have different clocking cycles for a scanner capable of scanning different low-resolution images. Therefore, the application specific integrated circuit must be designed anew leading to a slowdown of circuit design turnover.

SUMMARY OF THE INVENTION

Accordingly, one object of the present invention is to provide a method of generating clocking signals for a charge-coupled device capable of increasing scanning speed and image quality for a low-resolution scanning. The method is also adaptable to the clocking requirements of different types of charge-coupled devices so that time for designing the scanning circuit of a scanner is reduced.

To achieve these and other advantages and in accordance with the purpose of the invention, as embodied and broadly described herein, the invention provides a method of generating clocking signals for a charge-coupled device. First, clocking cycle of a shift register signal, a reset signal and a positioning signal related to a charge-coupled device are set. In each cycle of a system clock, for the sampled charge signal that needs to be sampled by the charge-coupled device, cycle of the shift phase register signal corresponding to the charge signal may be extended by an adjustment. For the charge signal that needs to be discarded, cycle of the shift phase register signal corresponding to the charge signal may be shortened by an adjustment. In addition, duration of each cycle for the positioning signal is adjusted in each cycle of the system clock and each cycle of the shift register clock such that the analogue front-end processor can obtain a stable positioning voltage. Furthermore, duration of each cycle for the reset signal is adjusted in each cycle of the system clock and each cycle of the shift register clock corresponding to the charge signal that needs to be discarded. Ultimately, the analogue front-end processor generates a reset voltage to flush away to-be-discarded charge signals. Hence, without changing the internal circuit of an application specific integrated circuit, duty cycle of the shift register signal, the reset signal and the positioning signal may be modified.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
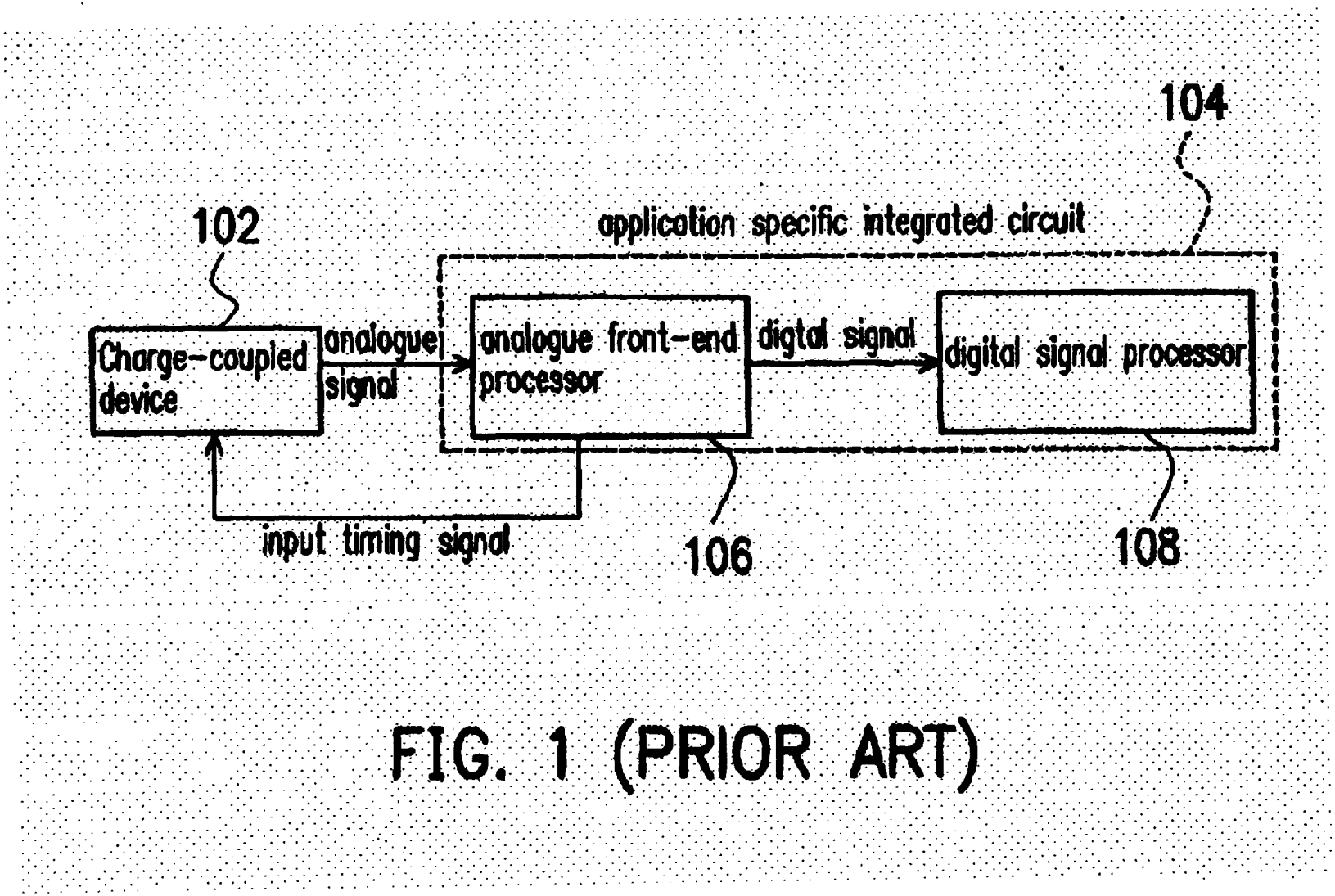
FIG. 1 (PRIOR ART)
FIG. 1 is a block diagram showing a portion of the circuit inside a conventional scanner.
Figure 2:
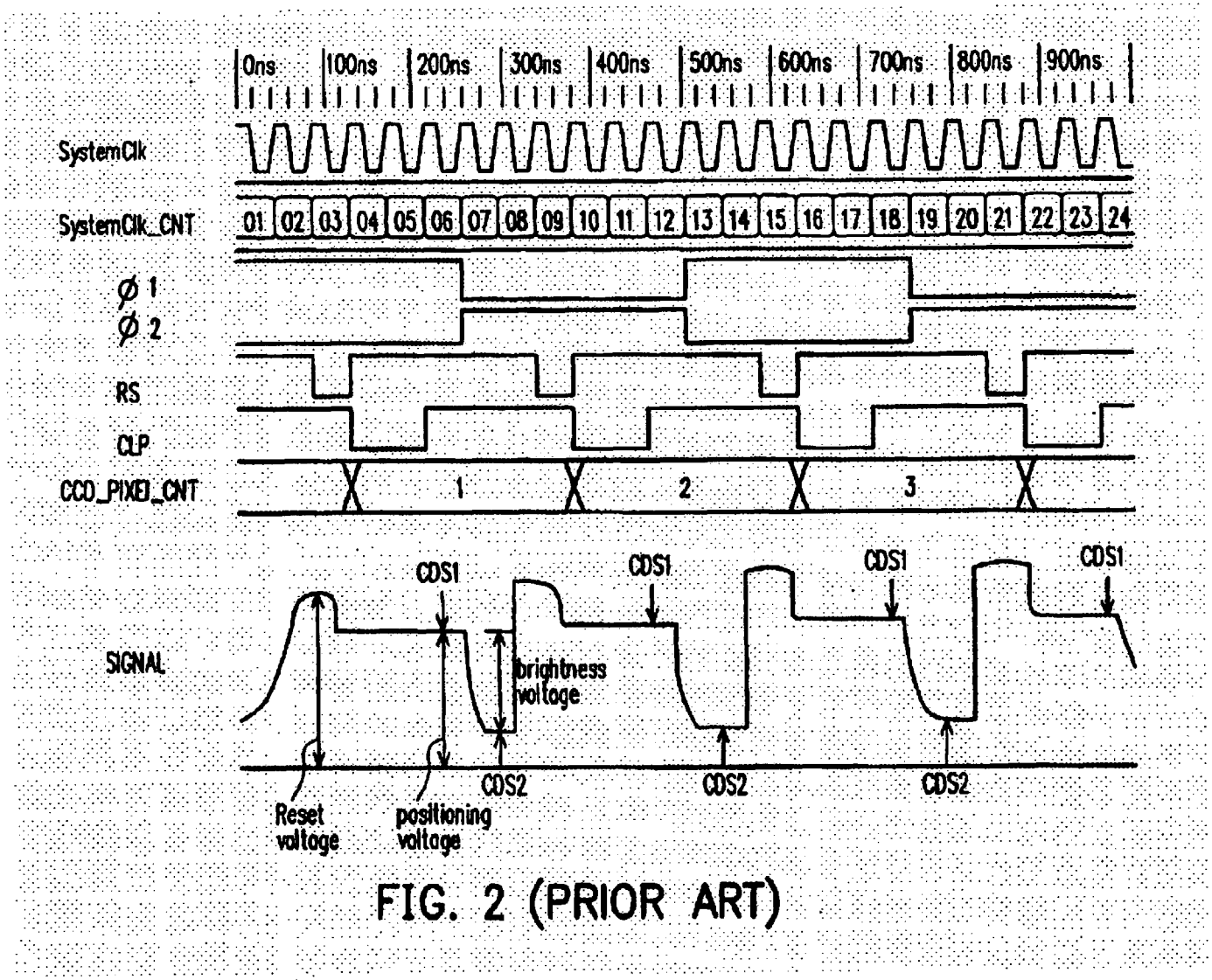
FIG. 2 (PRIOR ART)
FIG. 2 is a series of timing diagrams showing the clocking signals submitted to a conventional charge-coupled device during operation.

Reference will now be made in detail to the present preferred embodiments of the invention, examples of which are illustrated in the accompanying drawings. Wherever possible, the same reference numbers are used in the drawings and the description to refer to the same or like parts.

Figure 3:
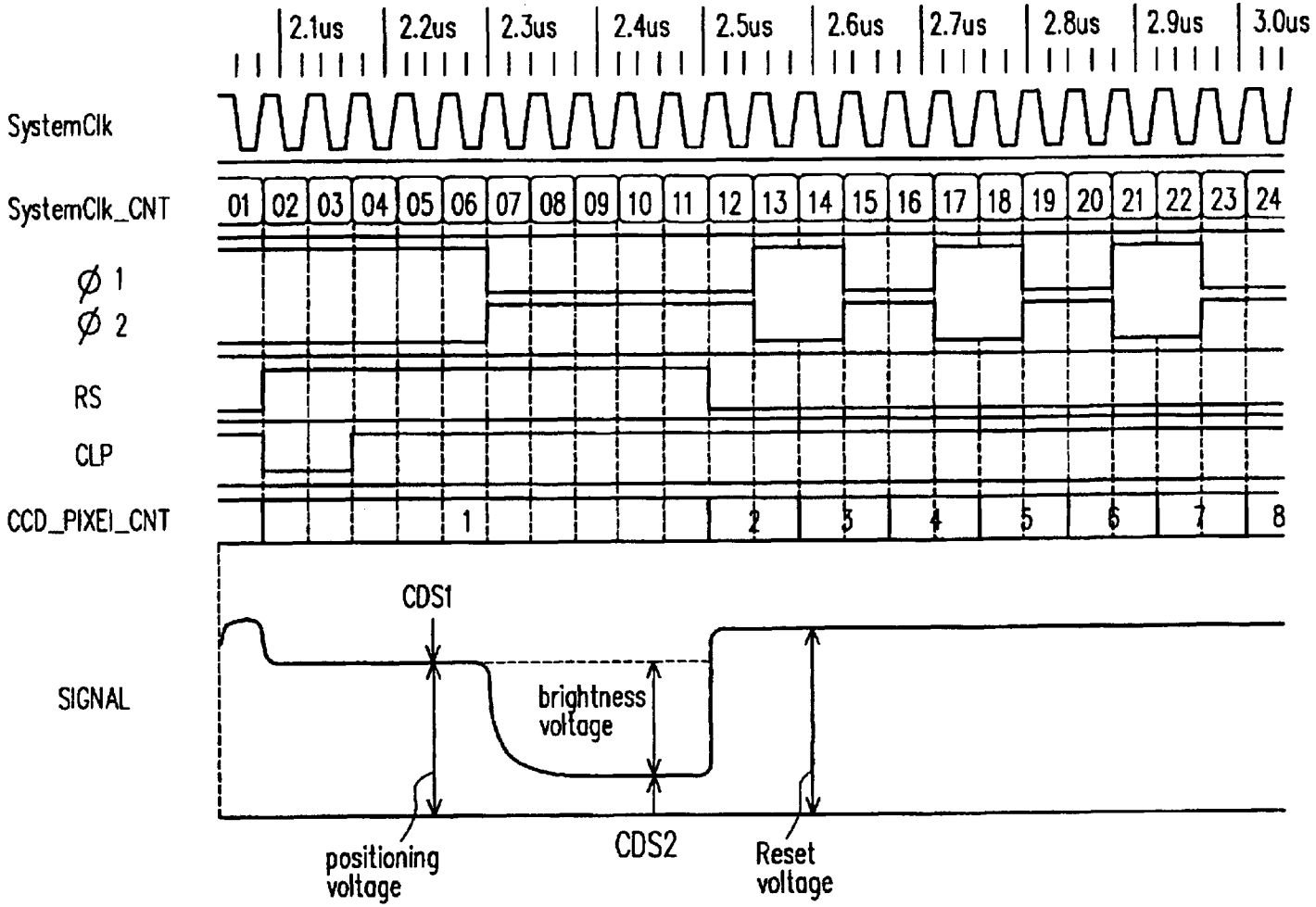
FIG. 3 is a series of timing diagrams showing the clocking signals of an operating charge-coupled device according to this invention.

FIG. 3 is a series of timing diagrams showing the clocking signals of an operating charge-coupled device according to this invention. In this embodiment, the scanner uses a 1200 dpi charge-coupled device to scan an image and produce a one-eighth or 150 dpi low-resolution image output. In FIG. 3, 24 system clock (SystemClk) cycles are shown. The first cycle of the shift register clocking signals Φ1, Φ2 (also the fifth, the ninth, . . . ) occupies 12 cycles of the system clock. The second to fourth (2–4) cycles of the shift register clocking signals Φ1, Φ2 (also the 6–8, 10–12, . . . ) occupies four cycles of the system clock. Different system clock cycles for the shift register clock signal are used because the charge signal sampled by the charge-coupled device may be extended or contracted. The charge signal is extended by increasing the number of system cycles in each shift register clock cycle (for example, the first, fifth, ninth, . . . cycle of the shift register clock signals Φ1, Φ2 all occupy 12 system cycles). Similarly, to discard some of the charge signal, the number of system cycles for each shift register clock cycles (for example, the 2–4, 6–8, 10–12 . . . cycle of the shift register clock signals Φ1, Φ2 all occupy 4 system cycles) is reduced.

In the first system cycle, the reset signal RS is at a 'L' logic level. The analogue front-end processor 106 (refer to FIG. 1) generates a reset voltage to flush away previous voltage signal in the charge-coupled device 102 (refer to FIG. 1). In the second system cycle, the reset signal changes from 'L' to 'H' (a high potential) and the positioning signal CLP changes from 'H' to 'L'. The analogue front-end processor 106 samples a positioning voltage at time node CDS1. The positioning voltage serves as a reference voltage for the analogue front-end processor 106. In the fourth system cycle, the positioning signal CLP changes back from 'L' to 'H' and the analogue front-end processor 106 sampled a charge voltage at time node CDS2. The charge voltage is the voltage formed by the charge signal transmitted from the shift register (not shown) to the analogue front-end processor 106. The voltage difference between the positioning voltage sampled at time CDS1 and the charge voltage sampled at time CDS2 is the brightness value at the first pixel of the charge-coupled device 102. The brightness value is transmitted as an analogue signal. The system clock and the first cycle of the shift register signals Φ1, Φ2 for sampling charge signal are used to adjust the duration of the positioning signal CLP level. Ultimately, the charge-coupled device is able to secure a stable positioning voltage.

Since the scanner performs a scanning operation using a one-eight resolution, the 2–8 charge signals sensed by the charge-coupled device 102 are discarded. Hence, in the 12–24 system cycle, the reset signal RS is at a 'L' logic level. In other words, potential produced by the analogue front-end processor 106 is at the reset voltage. The 2–8 charge signal within the shift register (not shown) are all reset. The system clock and the 2–8 cycles of the shift register signals Φ1, Φ2 for discarding the charge signal are used to adjust the duration of the reset signal RS level. Thus, the analogue front-end processor 106 generates a rest voltage to flush out all to be-discarded charge signals.

In brief, the scanner is able to adjust the operating cycles of a charge-coupled device according to the desired image quality and scanning speed. For example, to improve image quality, the number of system cycles for the positioning signal CLP may increase from 2 to 3 so that a stable positioning voltage is obtained at time node CDS1. Alternatively, duration for the analogue front-end processor to sample charge signal is increased so that a stable charge voltage is obtained at time node CDS2. That is, the duration of the first cycle of the shift register signal Φ1 is increased and the position of 'H' to 'L' level transition of the reset signal is adjusted. With this arrangement, a low-resolution image can have a high-resolution image quality. To increase the scanning speed of a scanner, one method is to reduce the four system clock cycles required by the $2^{nd}$ to $4^{th}$ cycles of the shift register signals Φ1, Φ2 to two system clock cycles only.

In FIG. 3, to produce the scan image having the aforementioned quality and speed in a low-resolution scanning, the relationship between the shift register timing signals Φ1, Φ2, the reset signal RS, the positioning signal CLP and the system clock is downloaded by programming into the application specific integrated circuit 104 (refer to FIG. 1). For example, in the first system clock cycle, the shift register signal Φ1 is 'H', the shift register signal Φ2 is 'L', the reset signal RS is 'L' and the positioning signal CLP is 'H'. These states are downloaded into the application specific integrated circuit 104 (refer to FIG. 1) in an address that corresponds to the first cycle of the system clock. In the second system clock cycle, the shift register signal Φ1 is 'H', the shift register signal Φ2 is 'L', the reset signal RS is 'H' and the positioning signal CLP is 'L'. Similarly, these states are downloaded into the application specific integrated circuit 104 in an address that corresponds to the second cycle of the system clock. Ultimately, the states regarded the shift register signals Φ1, Φ2, the reset signal RS and the positioning signal CLP that corresponds to all 24 clock cycles of the clock system are downloaded into the application specific integrated circuit 104. To modify the image-scanning resolution or change the timing of the shift register signals Φ1, Φ2, the reset signal RS or the positioning signal CLP, new sets of signaling data may be re-programmed into the application specific integrated circuit 104. There is no need to temper with the circuit inside the application specific integrated circuit 104.

In conclusion, scanning speed of a low-resolution scanning operation is increased through changing the duration of various duty cycles controlling a charge-coupled device. In addition, there is no need to redesign the circuit inside an application specific integrated circuit for a change in resolution. Duration of various operating signals can be downloaded into the application specific integrated circuit by programming. Hence, time for designing the internal circuit of an application specific integrated circuit is shortened.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of generating timing signals for a charge-coupled device, comprising [the steps of]:

determining cycles of each input timing signal sent to control the charge-coupled device; and adjusting *a* position of each cycle of the input timing signals according to each cycle of a system clock;

wherein each [duty] cycle of the input timing signal for the charge-coupled device determines each [duty] cycle of a shift register timing signal of the charge-coupled device, and for a charge signal that needs to be sampled by the charge-coupled device, duration of the cycle of the shift register *timing* signal corresponding to the charge signal is extended, and for another charge signal that needs to be discarded by the charge-coupled device, duration of the cycle of the shift register *timing* signal corresponding to the charge signal is shortened.

2. The method of claim 1, wherein the cycle of the shift register timing signal corresponding to the to-be-sampled charge signal is adjusted through changing cycle duration of a positioning signal so that an [analogue] *analog* front-end processor inside an application specific integrated circuit can receive a stable positioning voltage.

3. The method of claim 1, wherein the cycle of the shift register timing signal corresponding to the to-be-discarded charge signal is adjusted through changing cycle duration of a reset signal so that an analogue front-end processor inside an application specific integrated circuit can produce a reset voltage for flushing away the to-be-discarded charge signal.

4. The method of claim 1, wherein input timing signals produced by an application specific integrated circuit according to [a] *the* system clock are transmitted to the charge-coupled device.

5. The method of claim 4, wherein [a] *the* position of each cycle of the input timing signals relative to each cycle of the system clock is programmed into the application specific integrated circuit.

6. A method of generating timing signals for controlling a charge-coupled device, comprising [the steps of]:

determining each cycle of a shift register signal, a reset signal and a positioning signal for the charge-coupled device;

in each cycle of a system clock, lengthening the cycle of the shift register signal corresponding to a charge signal that needs to be sampled by the charge-coupled device[;], and shortening the cycle of the shift register signal corresponding to another charge signal that needs to be discarded by the charge-coupled device;

in each cycle of the system clock and each cycle of the shift register signal, adjusting cycle duration of the positioning signal so that an [analogue] *analog* front-end processor can obtain a stable voltage; and in each cycle of the system clock and each cycle of the shift register signal that corresponds to the to-be-discarded charge signal, adjusting cycle duration of the reset signal so that the [analogue] *analog* front-end processor generates a reset signal to flush away the to-be-discarded charge signal.

7. The method of claim 6, wherein input timing signals produced by an application specific integrated circuit according to [a] *the* system clock are transmitted to the charge-coupled device.

8. The method of claim 7, wherein a position of each cycle of the shift register signal, the positioning signal and the reset signal relative to each cycle of the system clock is programmed into the application specific integrated circuit.

*9. An apparatus, comprising:*

*a charge-coupled device including a shift register; and*

*a timing signal generation circuit coupled to the charge-coupled device, wherein the timing signal generation circuit is configured to generate a shift register clock signal for driving the charge-coupled device, wherein the shift register clock signal has a first cycle time and a second cycle time, wherein the second cycle time is shorter in duration than the first cycle time, and wherein the first cycle time and the second cycle time are associated with a single scanning period.*

*10. The apparatus of claim 9, wherein the charge-coupled device is configured to output a voltage during the first cycle time and, wherein the voltage corresponds, at least in part, to a charge signal sampled by the charge-coupled device.*

*11. The apparatus of claim 9, wherein the charge-coupled device is configured to output a reset voltage during the second cycle time.*

*12. The apparatus of claim 9, wherein the charge-coupled device is configured to not output a voltage during the second cycle time and, wherein the voltage corresponds, at least in part, to a charge signal sampled by the charge-coupled device.*

*13. A method, comprising:*

*applying a first timing signal during a horizontal scanning period for a first period of time to cause a scanner sensor to output a voltage corresponding, at least in part, to a first sampled charge signal; and*

*applying the first timing signal for a second period of time during the horizontal scanning period to cause the scanner sensor to not output a voltage corresponding, at least in part, to a second sampled charge signal, wherein the second period of time is shorter in duration than the first period of time.*

*14. The method of claim 13, wherein the scanner sensor is a charge-coupled device.*

*15. An analog front-end processor for use in combination with a charge-coupled device (CCD), the analog front-end processor comprising:*

*a system clock input configured to receive a system clock signal;*

*a digital output configured to provide digital data in response to analog signals received from the CCD;*

*clocking signal outputs configured to provide shift register timing signals to drive the CCD, wherein the shift reg-*

*ister timing signals are synchronized to the system clock signal, and wherein each timing signal has a period equal to an integer number of cycles of the system clock signal;*

*means for determining a selected output image resolution;*

*an analog input voltage sampling circuit configured to sample an analog charge signal input from the CCD; and*

*means responsive to the selected output image resolution for, if the selected output image resolution is a low resolution relative to a predetermined image resolution:*

*reducing a number of system clock cycles of the shift register timing signals to increase image scanning speed; and*

*lengthening a duty cycle of the analog input voltage sampling circuit to ensure that the analog charge signal sampled by the analog input voltage sampling circuit is accurate.*

*16. The analog front-end processor of claim 15, wherein the means for lengthening a duty cycle comprises means for discarding or not sampling the analog charge signal during selected clock cycles.*

*17. The analog front-end processor of claim 16, wherein the analog front-end processor generates a reset voltage to flush out the to-be-discarded analog charge signal.*

*18. The analog front-end processor of claim 15, wherein the analog front-end processor generates a positioning voltage for use as a reference voltage to determine pixel brightness value, and wherein the means for lengthening a duty cycle comprises means for increasing a time period from generating the positioning voltage to sampling the analog charge signal so that the positioning voltage is stable at a charge voltage sample time even though the number of system clock cycles of the shift register timing signals is reduced.*

*19. The analog front-end processor of claim 18, wherein the means for increasing a time period comprises means for adjusting a duration of a positioning signal in response to both the system clock signal and a first cycle of the shift register timing signals.*

*20. The analog front-end processor of claim 19, wherein the positioning signal is held unchanged over subsequent cycles of the shift register timing signals until a new low-resolution sampling cycle begins.*

*21. The analog front-end processor of claim 19, wherein the analog front-end processor is formed together with a digital processing circuit in a common semiconductor integrated circuit, and wherein the digital processing circuit is configured to receive the digital data output from the analog front-end processor in response to the sampled analog charge signal received from the CCD.*

* * * * *

UNITED STATES PATENT AND TRADEMARK OFFICE

CERTIFICATE OF CORRECTION

PATENT NO. : RE41,704 E
APPLICATION NO. : 11/247004
DATED : September 14, 2010
INVENTOR(S) : Shih et al.

It is certified that error appears in the above-identified patent and that said Letters Patent is hereby corrected as shown below:

Column 5, line 50, in Claim 3, delete “analogue” and insert -- analog --.

Column 6, lines 29-32, in Claim 9, delete “a first cycle time and a second cycle time, wherein the second cycle time is shorter in duration than the first cycle time, and wherein the first cycle time and the second cycle time” and
insert -- a first cycle and a second cycle, wherein the second cycle comprises fewer cycles of a system clock than the first cycle, and wherein the first cycle and the second cycle --.

Column 6, lines 35-36, in Claim 10, delete “first cycle time” and insert -- first cycle --.

Column 6, line 40, in Claim 11, delete “second cycle time.” and insert -- second cycle. --.

Column 6, lines 42-43, in Claim 12, delete “second cycle time” and insert -- second cycle --.

Column 6, line 48, in Claim 13, delete “a first period of time” and insert -- a first cycle of a shift register signal --.

Column 6, line 51, in Claim 13, delete “a second period of time” and insert -- a second cycle of the shift register signal --.

Column 6, line 55, in Claim 13, delete “second period of time” and insert -- second cycle --.

Column 6, line 56, in Claim 13, delete “first period of time.” and insert -- first cycle. --.

Signed and Sealed this
Tenth Day of July, 2012

David J. Kappos

David J. Kappos
*Director of the United States Patent and Trademark Office*